US009081942B2

(12) United States Patent
Gheva et al.

(10) Patent No.: US 9,081,942 B2
(45) Date of Patent: Jul. 14, 2015

(54) USE OF USER LOCATION INFORMATION FOR REMOTE ACTIONS

(75) Inventors: Yair E. Gheva, Zichron Yaakov (IL); Elad Ben-Israel, Tel Aviv (IL); Eran Yariv, Zichron Yaakov (IL); Fadi Haik, Shafaram (IL)

(73) Assignee: Microsoft Technology Licensing, LLP., Redmond, WA (US)

( * ) Notice: Subject to any disclaimer, the term of this patent is extended or adjusted under 35 U.S.C. 154(b) by 150 days.

(21) Appl. No.: 13/156,366

(22) Filed: Jun. 9, 2011

(65) Prior Publication Data

US 2012/0317615 A1    Dec. 13, 2012

(51) Int. Cl.
*G06F 21/31* (2013.01)
*H04W 4/02* (2009.01)
*H04L 29/06* (2006.01)

(52) U.S. Cl.
CPC ........ *G06F 21/31* (2013.01); *G06F 2221/2111* (2013.01); *G06F 2221/2149* (2013.01); *H04L 63/107* (2013.01); *H04W 4/02* (2013.01)

(58) Field of Classification Search
CPC ....... H04W 4/02; H04W 48/02; H04W 48/04; H04W 8/08; H04W 8/082; H04W 8/10; H04W 8/12; H04W 8/16; H04W 64/00; G06F 21/00; G06F 3/002; G06F 21/31; G06F 2221/2149; G06F 2221/2111; H04L 63/107
USPC ......................................... 726/2–7
See application file for complete search history.

(56) References Cited

U.S. PATENT DOCUMENTS

| 6,563,430 | B1 | 5/2003 | Kemink et al. |
| 6,594,483 | B2 | 7/2003 | Nykanen et al. |
| 7,257,374 | B1* | 8/2007 | Creigh .......................... 455/41.2 |
| 2004/0003051 | A1* | 1/2004 | Krzyzanowski et al. ..... 709/217 |
| 2005/0198063 | A1 | 9/2005 | Thomas et al. |
| 2007/0287473 | A1 | 12/2007 | Dupray |
| 2008/0299989 | A1 | 12/2008 | King et al. |
| 2010/0082175 | A1 | 4/2010 | Gartner |
| 2010/0185303 | A1* | 7/2010 | Ellenby et al. ................... 700/12 |
| 2010/0199339 | A1* | 8/2010 | Kageyama ........................ 726/7 |
| 2011/0320119 | A1 | 12/2011 | Morales et al. |

OTHER PUBLICATIONS

"International Search Report", Mailed Date: Nov. 30, 2012, Application No. PCT/US2012/040630, Filed Date: Jun. 3, 2012, 11 pages.

(Continued)

*Primary Examiner* — Jung Kim
*Assistant Examiner* — Ayoub Alata
(74) *Attorney, Agent, or Firm* — Jessica Meyers; Danielle Johnston-Holmes; Micky Minhas (57) ABSTRACT

Architecture that provides location broker services which share the user location with other parties (e.g., based on user consent). Stationary computing devices can also determine the location of the user operator and interact accordingly. In one embodiment, the user location is retrieved from the user mobile device (e.g., smart phone) and is transmitted to other mobile or non-mobile devices with which the user interacts. Moreover, existing infrastructure and systems can be employed using a device driver that emulates the user location so that any software that uses the location services does not need modification.

20 Claims, 7 Drawing Sheets

(56) References Cited

OTHER PUBLICATIONS

Brumitt, et al., "EasyLiving: Technologies for Intelligent Environments", Retrieved at << http://research.microsoft.com/en-us/um/people/jckrumm/Publications%202000/huc2k-final.pdf >>, Handheld and Ubiqitous Computing, 2nd International Symposium, Sep. 2000.

"Location-based services (LBS)", Retrieved at << http://www.tacticalgamer.com/general-discussion/133880-location-based-services-lbs.html >>, Retrieved Date: Mar. 25, 2011.

Chen, et al., "An Intelligent Broker for Context-Aware Systems", Retrieved at << http://citeseerx.ist.psu.edu/viewdoc/download?doi=10.1.1.115.9230&rep=rep1&type=pdf >>, Adjunct Proceedings of Ubicomp, Oct. 12, 2003.

"Google Latitude API: a New Location Broker?", Retrieved at <<http://www.gpsbusinessnews.com/Google-Latitude-API-a-New-Location-Broker__a2256.html>>, Retrieved Date: Mar. 25, 2011.

\* cited by examiner

USE OF USER LOCATION INFORMATION FOR REMOTE ACTIONS

BACKGROUND

Non-mobile computing devices are user-centric by requesting users to login to specific accounts and preserving a personalized per-user experience (e.g., shortcuts, wallpaper, favorites, per-user files etc.). However, many of these scenarios typically require an interactive and a physical (same geographic location) type of interaction with the computing device.

Computing devices are unaware of the actual physical location of the associated user, which imposes some of the following limitations. For logged-off users, the computing device cannot work-on-behalf of its user based on the user location. For remotely logged-on users (e.g., a terminal service scenario), the computing device cannot easily determine the whereabouts of the user and provide an experience tailored to the actual user location.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides location broker services that share the user location with other parties based on user consent. Stationary computing devices can also determine the location of the associated computer operator and interact accordingly. In one embodiment, the user location is retrieved from the user mobile device (e.g., smart phone) and is transmitted to other mobile or non-mobile devices with which the user interacts. Moreover, existing infrastructure and systems can be employed using a device driver that emulates the user location so that any software that uses the location services does not need modification.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture enables the sharing of a device location with other computers (e.g., stationary) using a location broker. The existing infrastructure and systems can be retained and utilized by way of a device driver that emulates the user location so that any software that uses the location services does not need modification. In one embodiment, the user location is obtained from the user device (e.g., mobile phone) and transmitted to other mobile or non-mobile devices the user interacts with.

For example, a desktop computer can lock its console (and power down the monitor) when the user is not nearby. A household controller that detects all household members are not at home can turn off all heating devices and all electronic devices that are in standby. When dealing with multiple users of a group (e.g., family members, business employees, etc.), an averaging algorithm can be employed to process location-based information to enable actions by the applications such as to manage power and lighting for the residence or business, per room, etc. When a member of the household approaches the residence, the controller can turn on the heating and restore all power to devices. If the user is not at home for an extended time, the controller can turn lightning on and off as a security measure, for example.

This can be applied to different age groups of users and family members as well. For example, if a babysitter is recognized as a member of the group when working at the residence, specific security measures can be employed when a parent is determined to be away from the residence such as restricting computer access to certain websites, locking windows, notifying neighbors of the babysitting, etc.

In another example, an enterprise computer can set the user status to out-of-office (OOF) when the user is not at work (or home), and this can also be reported to a time keeping application, for example. An enterprise presence system can automatically update the user's location, which is desirable for users that work in various physical locations.

In yet another example, a browser running on a desktop computer that knows the computer location can share the location with websites, that in turn can provide a local experience (e.g., a weather site can provide weather relevant to the user location). When a user connects to a remote computer, the user's physical location is determined and communicated rather than the location of the remote computer.

Assuming a location broker service knows the location of a specific user, if this location is shared with a stationary computer (e.g., owned by the user) applications running on the computer use the user's location in order to provide a different experience according to the user's location.

The disclosed architecture employs a location broker client (also referred to as a location broker component). The client is responsible of exposing the location (e.g., geolocation, IP location, etc.) of the user to applications running on the client machine. Applications can register with the location broker client and receive updates on the current user location. The location broker client reads the user location from the location broker service and updates registered applications according to the location information.

In one implementation, a virtual location sensor driver can be employed that is the location broker client. The driver reads the current user location from the location broker service (e.g., as posted by a mobile application) and updates the operating system location. Various applications, services, and operating system features respond to the location change and provide a tailored location-aware behavior.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
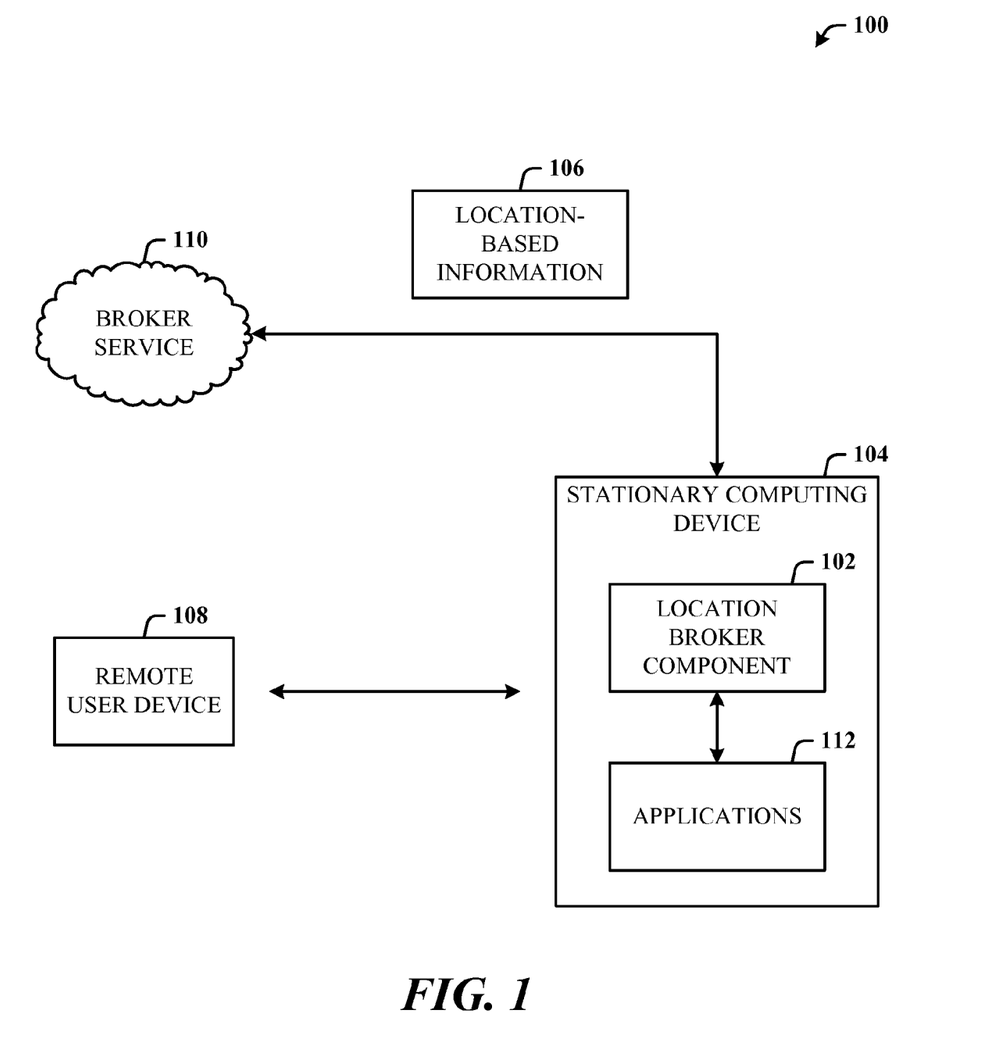
FIG. 1 illustrates a system in accordance with the disclosed architecture.

FIG. 1 illustrates a system 100 in accordance with the disclosed architecture. The system 100 includes a location broker component 102 of a stationary computing device 104 (e.g., desktop computer) that receives location-based information 106 (e.g., geographical data as to the geographic location of the device) associated with a remote user device 108 (e.g., a mobile phone, portable computer, etc.). The location-based information 106 can be received from an online broker service 110. The stationary computing device 104 also includes applications 112 that process the location-based information 106 (or instructions related to) and execute corresponding application functions based on the location-based information 106.

The applications 112 register to the location broker component 102 to receive the location-based information 106 and location-based information updates associated with the remote user device 108. The location broker component 102 reads the location-based information 106 from the broker service 110, which is a network-based location broker service.

The applications 112 can include an application that automatically prohibits login access to the stationary computing device 104 based on the location-based information 106. The applications 112 can include an application that automatically prohibits login access to the stationary computing device 104 and powers down a hardware subcomponent (e.g., display) of the stationary computing device 104 based on the distance of the remote user device 108 from the stationary computing device 104, the distance determined from the location-based information 106.

The applications 112 can include an application that automatically controls environmental systems (e.g., lights, air conditioning, cooling systems, security systems, heating systems, water systems, etc.) of a site (e.g., residence, business, etc.) based on the distance between the site, and one or more devices (e.g., mobile phone) of a user or group of users that function (e.g., live, work, etc.) at the site. The applications 112 can include an application that automatically sets a user status (e.g., out-of-office, at lunch, on business travel, etc.) relative to a site based on the location-based information 106. The location broker component 102 can update an enterprise tool with the user status. The enterprise tool can provide enterprise-wide information to other systems as to the user status. For example, the tool can link to and update presence information to a presence system. The applications 112 can include an application that automatically enables remote access of the stationary computing device 104 from the remote user device 108 based on the location-based information 106.

Figure 2:
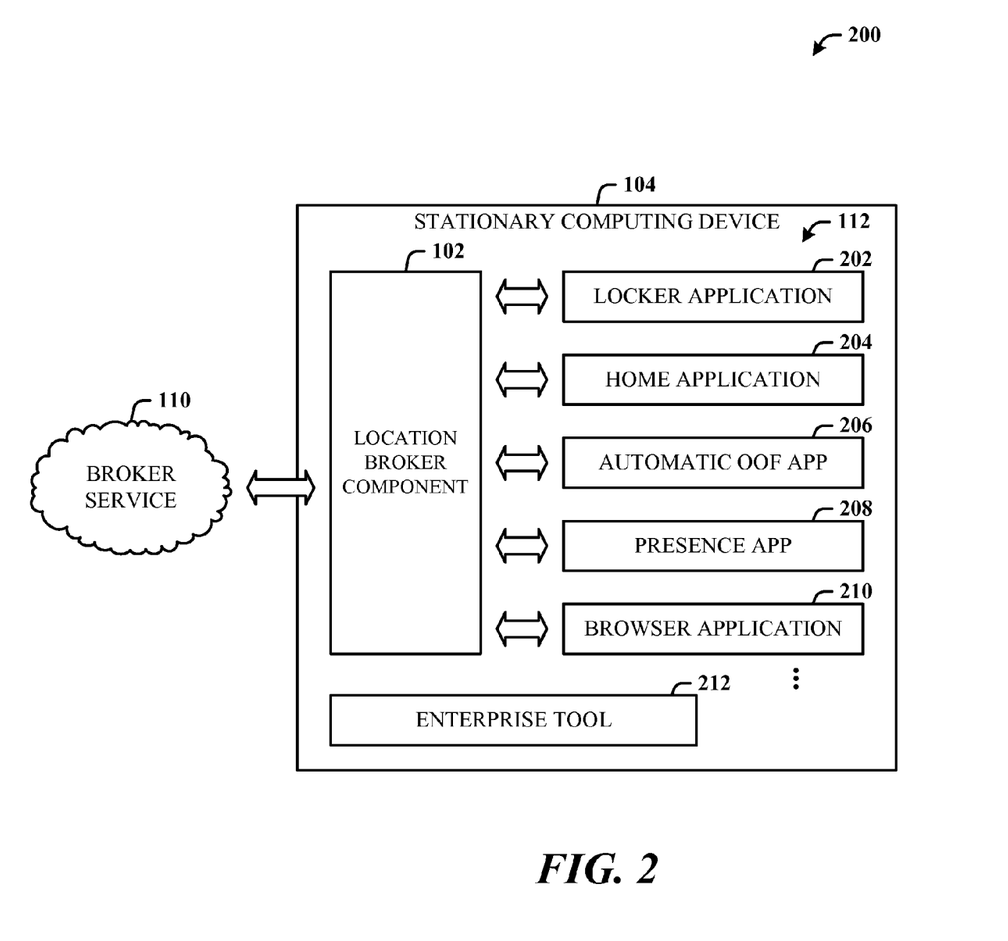
FIG. 2 illustrates a more detailed embodiment of a system that utilizes device location information in accordance with the disclosed architecture.

FIG. 2 illustrates a more detailed embodiment of a system 200 that utilizes device location information in accordance with the disclosed architecture. The system 200 illustrates in greater detail that the applications 112 can include a locker application 202 that automatically locks (e.g., invokes login protection) the stationary computing device 104 and powers off the display (disables any possible meaningful user interaction) when the user is not near the stationary computing device 104.

The locker application 202 can be designed to present a user interface such that the user can configure the physical location of the stationary computing device 104, and a local service (not shown) of the stationary device 104 that registers with the location broker component 102. Once the service receives a location update notification (e.g., the location-based information 106) from the location broker component 102 the locker application 202 rechecks the distance (e.g., geographical) between the user (the remote user device 108) and the stationary device 104. If the distance is greater than a previously computed distance, and/or greater than a predefined threshold value, the stationary device 104 is locked. The locking process can include logging the user (and any other users) out and invoking a username/password request for future logins, locking by invoking a password protected screensaver, powering down a wired network interface connection, yet maintaining a wireless mobile network connection of the stationary device 104, enabling a camera and video recordings of the stationary device 104, activating a microphone and audio recordings of the stationary device 104, and so on.

Computers are in widespread use to control and manage business environments, but are in increasing use in residences residence environmental systems as well. Vendors now provide controller applications that turn lights off and on, and perform other operations for the home. The applications 112 include an enhanced home application 204 that receives location updates from the location broker component 102 and determines the distance of one or more residence members (as determined from accompanying user devices) from the location of the residence (e.g., home, apartment, etc.) as determined relative to the stationary computing device 104 of the residence.

If the distance of the remote user device 108 (of a resident member) meets or exceeds a first threshold distance, the home application 204 can operate to power off lights and heating, for example. If the distance of the one or more residence members meet or exceed a second distance threshold, the home application 204 can operate to power down turn selected residential devices and systems that were previously set or are in a standby mode.

When a residential member returns to the residence, the home application 204 can manage the residential systems and devices (e.g., appliances, alarm systems, media systems, camera systems, etc.) to power on the devices and systems in anticipation of the member arrival. In another example, if all household members are a predetermined distance from the stationary computing device 104, the home application 204 can operate to invoke security and turn on alarm systems. This can apply as well to a member who is home (distance is minimal) and when considering other parameters such as time and historical data for the specific member it can be inferred that the member is going to sleep, the home application 204 can turn on the alarm system.

The applications 204 can include an out-of-office (OOF) application 206 that automatically sets the user status to OOF when the user location is not near (a predetermined distance from) the user's office site, the company campus, etc. The OOF application 206 can utilize a plug-in model so that once user is set to OOF status the OOF application 206 notifies an enterprise tool that is then updated and can further send information to consuming applications (e.g., local, external) and/or services that use the information for the designed purposes such a mail servers.

A presence application 208 can use the location-based information to update presence information of a presence server to notify other users of the user status.

The location broker component 102 can provide the location-based information to a suitable browser 210 (e.g., that support HTML 5) and the browser 210 then shares the location-based information with websites that use the user location information.

In yet another implementation, when the user (location via remote user device 108) is determined to be a predetermined distance (e.g., geolocation, via IP (Internet protocol) address, instant messaging address, SMS (short message service) address, etc.) from the remote user device 108, the remote user device 108 as well as the stationary computing device 104 can be automatically configured for remote access control (e.g., terminal services, remote desktop protocol, etc.). That is, the remote user device 108 can perform the operations utilized to prepare both the remote user device 108 and the stationary device 104 for such user interaction, according to a user selection on the remote user device 108.

Given that the geo-location information (can be included in the location-based information 106) of the remote user device 108 can be determined, the disclosed architecture can also compute heading and speed of the remote user device 108 as a parameter to infer how one or more of the applications 112 operate. Rather than waiting for the remote user device 108 to trigger a predetermined distance threshold, if the heading and speed is computed, an application can use this information to invoke an operation. For example, if the heading and speed indicate the user is moving away from the site, it can be inferred that the user will not be returning for some time, and thus, the home application 204 can activate home-based functions accordingly, such as controlling home systems into a standby mode. Similarly, the locker application 202 can activate a lockdown protocol that locks the stationary computing device and powers down the display, sooner than if a predetermined distance threshold is reached.

It is to be appreciated that the inference approach and the predetermined distance approach can work in cooperation such that the predetermined distance threshold can be used as a confirmation (or validation) to the inference approach that the user has actually moved away from the site.

An enterprise tool 212 can be employed to interface to one or more of the applications 112 in order to provide information from the one or more applications 112 to other systems or services. As previously indicated, for example, if it is determined by the OOF application 206 that the user is away from the office, the OOF status can be passed to the enterprise tool 212 to then provide the OOF status information to other consuming systems and/or services of the enterprise.

One or more of the applications 112 can be managed as part of a user security model that enables the user to opt-in or opt-out so that perceived personal information is not published, such as for the browser application 210 sending information to other websites. Accordingly, a security component (not shown) can be employed for authorized and secure handling of user information. The security component allows the user to opt-in and opt-out of tracking information as well as personal information that may have been obtained and may be utilized thereafter. The user can be provided with notice of the collection of personal information, for example, and the opportunity to provide or deny consent to do so, at either or both of the remote user device 108 or/and the stationary computing device 104.

Consent can take several forms. Opt-in consent imposes on the user to take an affirmative action before the data is collected and processed. Alternatively, opt-out consent imposes on the user to take an affirmative action to prevent the collection of data before that data is collected. This is similar to implied consent in that by doing nothing, the user allows the data collection after having been adequately informed.

A dialog box can be presented as to notice and consent. The dialog box asks for consent via a radio button, for example to opt-in to the data collection, includes an explanation on what the data will be used for, and can also include a prominent link to a privacy policy statement. The security component ensures the proper collection, storage, and access to the user information while allowing for the dynamic selection and presentation of the content, features, and/or services.

One way from which to ascertain the geo-location of the remote user device 108 is geo-fencing technology. Geo-fencing technology can be employed to determine the geolocation of the remote user device to a point of interest (e.g., the stationary computing device 104). A geo-fence is a predefined virtual perimeter (e.g., within a two mile radius) of a physical geographic area. Alternatively, or in combination with radius-based geo-fences, polygon-based geo-fencing can be employed as well. When the geo-location of the remote user device 108 matches the geo-location information that defines the virtual perimeter, specified events can be triggered to occur (e.g., by one or more of the applications 112), such as sending a notification to a requesting component (e.g., the local broker component 102).

In other words, the geo-fence can be employed to determine the distance of the remote user device 108 (e.g., a mobile phone) from the stationary device 104. Alternatively, GPS (global positioning system) and/or other location-based technologies (e.g., triangulation) can be used for determining the distance. A geo-fence service can be employed to provide the geolocation information to the broker service 110. Similarly, the GPS data can be provided to the broker service.

The geolocation tracking information can be obtained via consent of the user as well, as described in association with the security component herein above.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
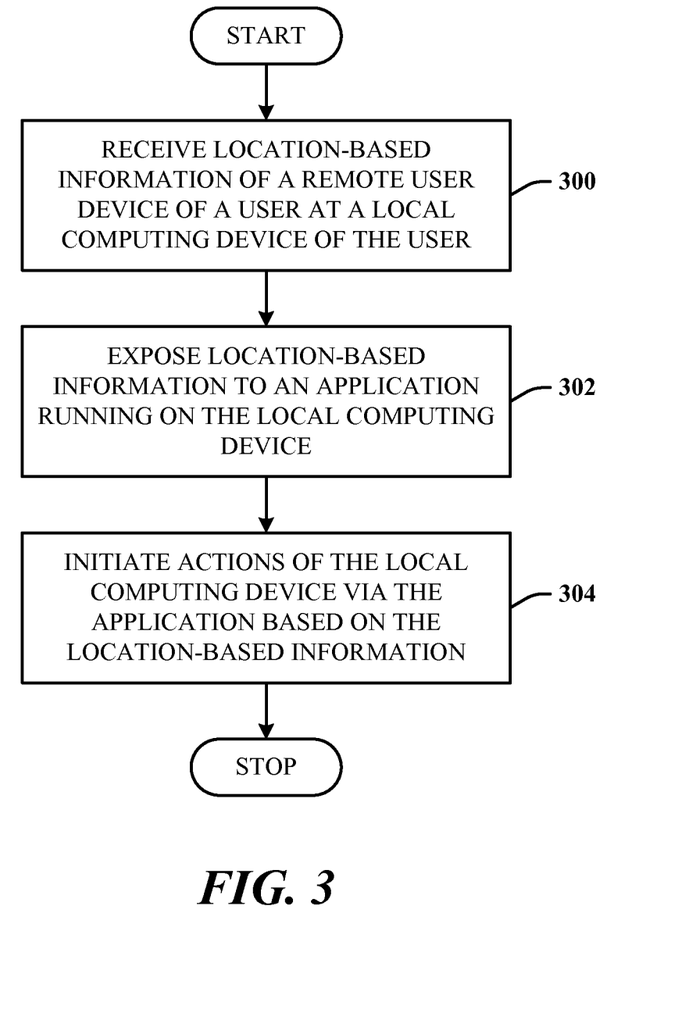
FIG. 3 illustrates a method in accordance with the disclosed architecture.

FIG. 3 illustrates a method in accordance with the disclosed architecture. At 300, location-based information (e.g., geolocation) of a remote user device (e.g., mobile phone, portable computer, etc.) of a user is received at a local computing device (e.g., desktop computer) of the user. At 302, the location-based information is exposed to an application (one of many possible) running on the local computing device. At 304, actions (e.g., shutting down a display, invoking a login protocol, etc.) of the local computing device are initiated via the application based on the location-based information.

Figure 4:
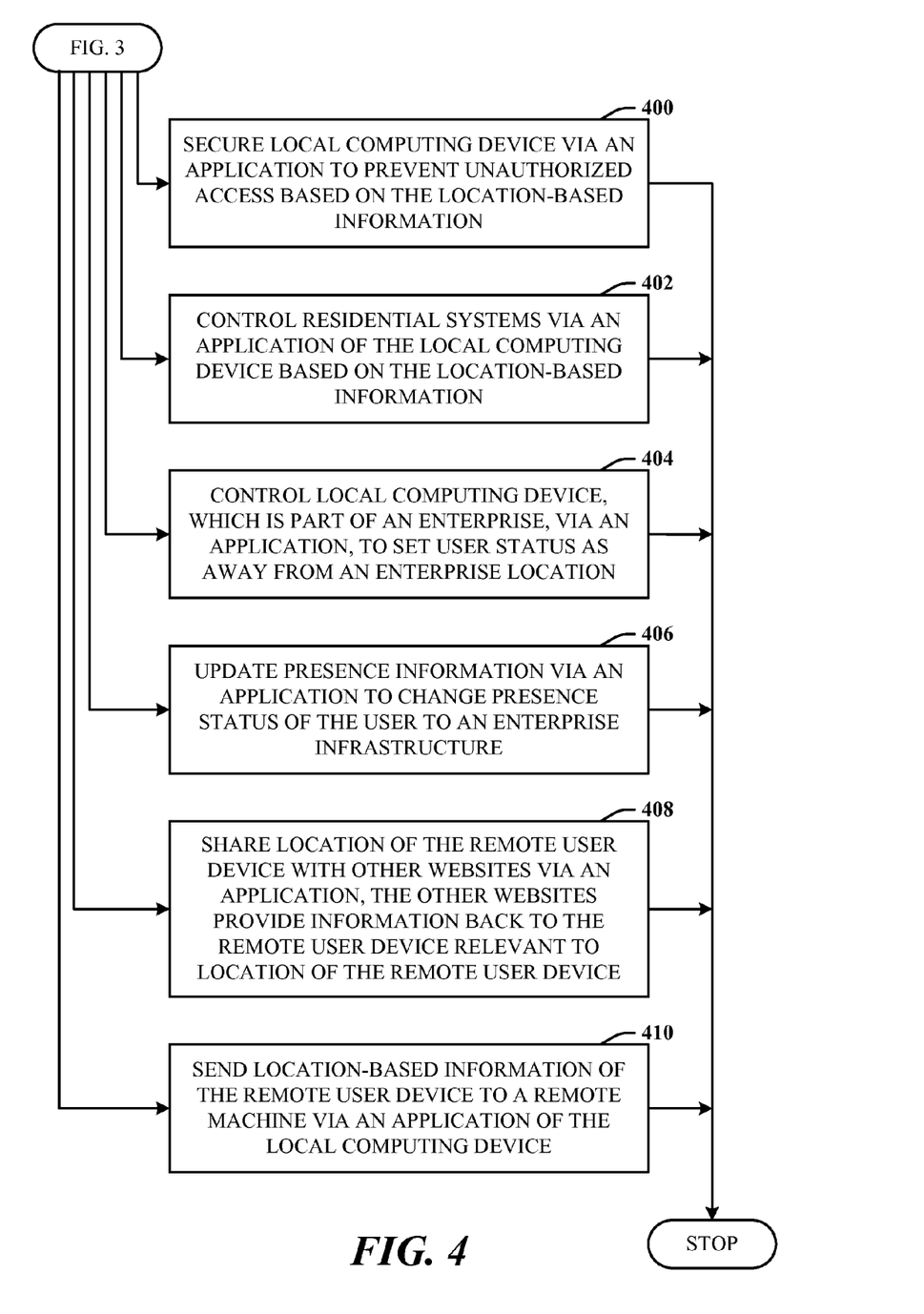
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the local computing device is secured (e.g., invoke a login protocol, password protected screensaver, etc.) via an application (e.g., operating system) to prevent unauthorized access based on the location-based information. At 402, residential systems (e.g., appliances, security systems, wireless communication with automobile security systems, etc.) are controlled via an application of the local computing device based on the location-based information.

At 404, the local computing device (e.g., enterprise desktop computer), which is part of an enterprise, is controlled via an application, to set user status as away from an enterprise location. At 406, presence information is updated via an application to change presence status of the user to an enterprise infrastructure. At 408, location of the remote user device is shared with other websites (e.g., weather, traffic, businesses, sales, product information, product deals, etc.) via an application. The other websites can provide information back to the remote user device relevant to the location of the remote user device. At 410, the location-based information of the remote user device is sent to a remote machine (e.g., the local computing device, and/or other user computing devices) via an application of the local computing device.

Figure 5:
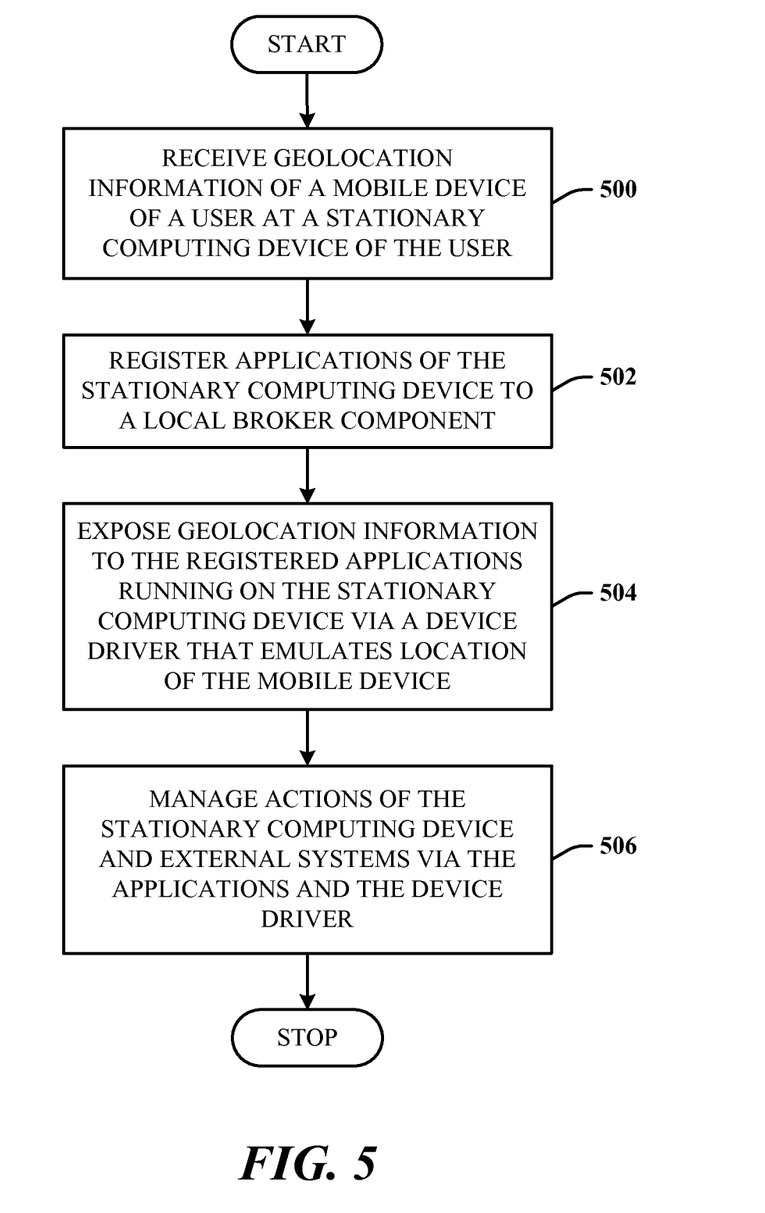
FIG. 5 illustrates an alternative method in accordance with the disclosed architecture.

FIG. 5 illustrates an alternative method in accordance with the disclosed architecture. At 500, geolocation information of a mobile device of a user is received at a stationary computing device of the user. At 502, applications of the stationary computing device are registered to a local broker component. At 504, the geolocation information is exposed to the registered applications running on the stationary computing device via a device driver that emulates location of the mobile device. At 506, actions of the stationary computing device and external systems (e.g., home systems, business systems, etc.) are managed via the applications and the device driver.

Figure 6:
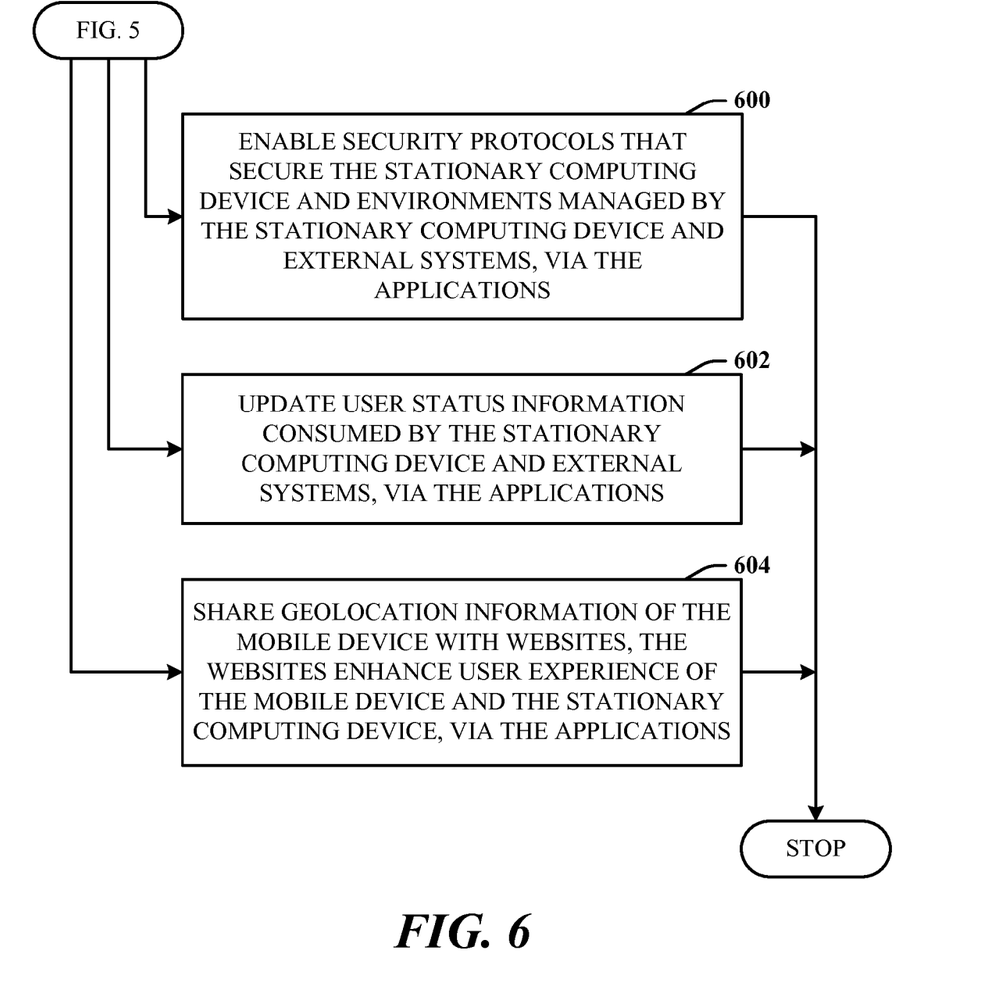
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, security protocols are enabled that secure the stationary computing device and environments managed by the stationary computing device and external systems, via the applications. At 602, user status information consumed by the stationary computing device and external systems is updated, via the applications. At 604, the geolocation information of the mobile device is shared with websites. The websites enhance user experience (e.g., provide weather information, traffic information, status/location of family members, etc.) of the mobile device and the stationary computing device, via the applications.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
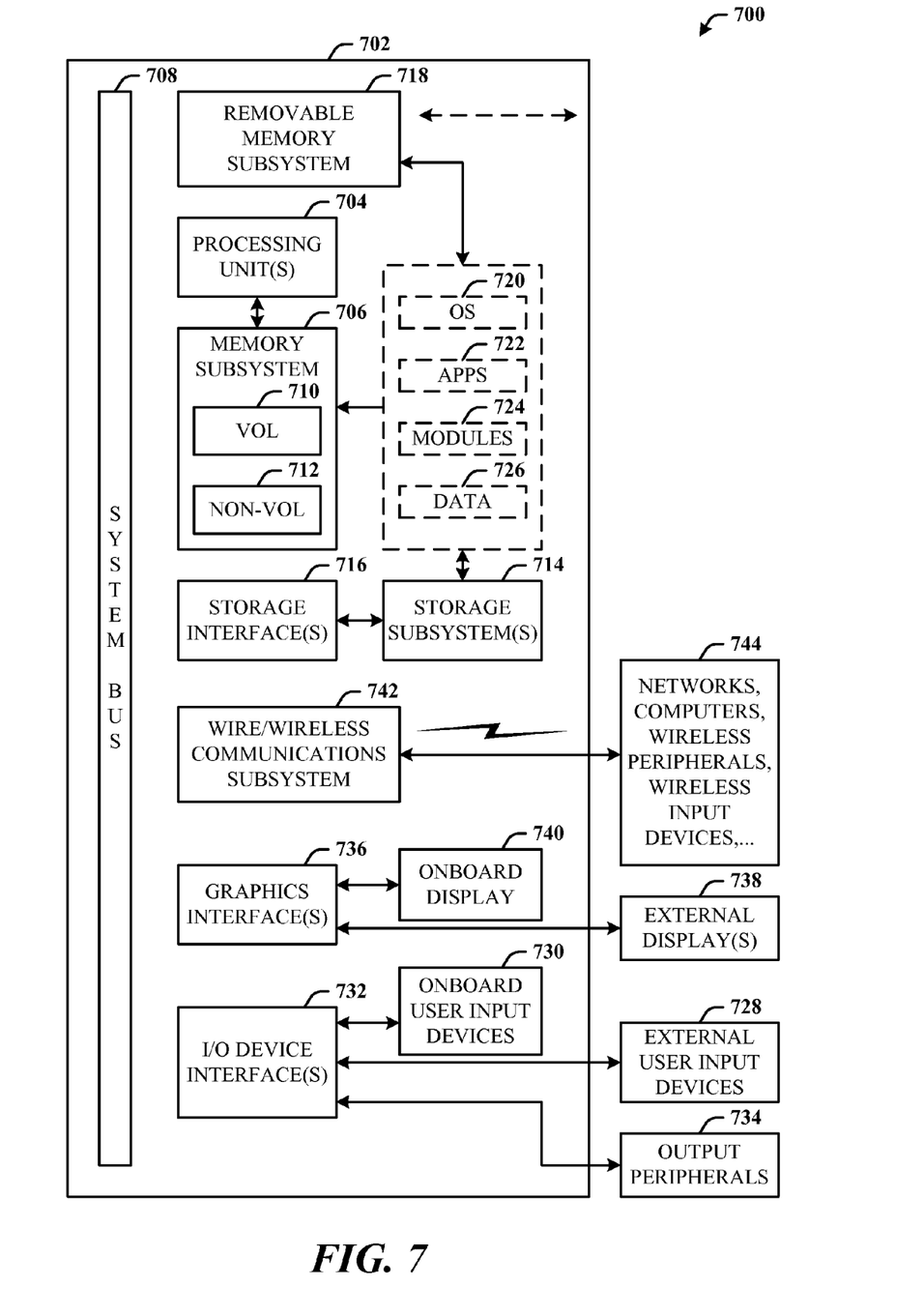
FIG. 7 illustrates a block diagram of a computing system that executes location information in accordance with the disclosed architecture.

Referring now to FIG. 7, there is illustrated a block diagram of a computing system 700 that executes location information in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components of the system 200 of FIG. 2, and methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines). It is also to be understood that suitable entities and components can also be implemented on a mobile device such as a cell phone.

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
a location broker component of a stationary computing device wherein:
the location broker component receives location-based information associated with a remote user device from an online broker service, the stationary computing device is configured to have a geographic location, and the location-based information comprises a geographic location of the remote user device;
applications of the stationary computing device that:
receive the location-based information from the location broker component,
process the location-based information to determine a distance from the remote user device to the stationary computing device according to the geographic location of the remote user device and the geographic location of the stationary computing device, and
execute corresponding application functions based on the determined distance from the remote user device to the stationary computing device;
wherein the applications include at least an application that automatically prohibits login access to the stationary computing device based on the determined distance from the remote user device to the stationary computing device; and
a processor that executes computer-executable instructions associated with at least one of the location broker component and the applications.

2. The system of claim 1, wherein the applications register to the location broker component to receive location-based information updates associated with the remote user device.

3. The system of claim 1, wherein the location broker component reads the location-based information from the location broker service.

4. The system of claim 1, wherein the applications include an application that automatically prepares the stationary computing device for remote access by the remote user device based on the determined distance from the remote user device to the stationary computing device.

5. The system of claim 1, wherein the applications include an application powers down a display of the stationary computing device based on the determined distance of the remote user device from the stationary computing device.

6. The system of claim 1, wherein the applications include an application that automatically controls environmental systems of a site based on distance between the site, and one or more devices of a user or group of users that function at the site.

7. The system of claim 1, wherein the applications include an application that automatically sets a user status relative to a site based on the location-based information.

8. The system of claim 7, wherein the location broker component updates an enterprise tool with the user status, the enterprise tool provides enterprise-wide information to other systems as to the user status.

9. The system of claim 1, wherein the applications include an application that automatically enables remote access of the stationary computing device from the remote user device based on the location-based information.

10. A computer-implemented method, comprising acts of:
receiving location-based information of a remote user device of a user from an online broker service at a location broker component operating on a local computing device of the user, the location-based information comprising a geographic location of the remote user device;
exposing the location-based information to an application running on the local computing device through the location broker component, wherein the application running on the local computing device is registered with the location broker component;
initiating actions of the local computing device via the application when the distance between the remote user device and the local computing device is greater than a predetermined threshold value, wherein the distance between the remote user device and the local computing device is determined according to the geographic location of the remote user device and a geographic location of the local computing device, wherein at least one action comprises prohibiting login access to the local computing device when the distance between the remote user device and the local computing device is greater than a predetermined threshold value; and
utilizing a processor that executes instructions stored in memory to perform at least one of the acts of receiving, exposing, or initiating.

11. The method of claim 10, further comprising automatically securing the local computing device via an application to prevent unauthorized access based on the determined distance between the remote user device and the local computing device.

12. The method of claim 10, further comprising controlling residential systems via an application of the local computing device based on the location-based information.

13. The method of claim 10, further comprising controlling the local computing device, which is part of an enterprise, via an application, to set user status as away from an enterprise location.

14. The method of claim 10, further comprising updating presence information via an application to change presence status of the user to an enterprise infrastructure.

15. The method of claim 10, further comprising sharing location of the remote user device with a plurality of websites via an application, the plurality of websites provide information back to the remote user device relevant to location of the remote user device.

16. The method of claim 10, further comprising sending the location-based information of the remote user device to a remote machine via an application of the local computing device.

17. A computer-implemented method, comprising acts of:
receiving geolocation information of a mobile device of a user from an online broker service at a stationary computing device of the user, wherein the stationary computing device is associated with a geolocation and wherein the geolocation information includes a geolocation of the mobile device;
registering applications of the stationary computing device to a local broker component, wherein at least one of the registered applications automatically prohibits login access to the stationary computing device based on the determined distance from the mobile device to the stationary computing device;
exposing the geolocation information to the registered applications running on the stationary computing device via a device driver on the stationary computing device that provides the location of the mobile device;
managing actions of the stationary computing device and external systems via the applications and the device driver when the distance of the mobile device to the stationary computing device exceeds a predetermined threshold determined according to the geolocation of the mobile device and the geolocation of the stationary computing device; and utilizing a processor that executes instructions stored in memory to perform at least one of the acts of receiving, registering, exposing, or managing.

18. The method of claim 17, further comprising enabling security protocols that secure the stationary computing device and environments managed by the stationary computing device and external systems, via the applications.

19. The method of claim 17, further comprising updating user status information consumed by the stationary computing device and external systems, via the applications.

20. The method of claim 17, further comprising sharing the geolocation information of the mobile device with websites, the websites enhance user experience of the mobile device and the stationary computing device, via the applications.

* * * * *